(12) United States Patent
Snyder

(10) Patent No.: US 12,024,083 B2
(45) Date of Patent: *Jul. 2, 2024

(54) CHASSIS FOR RECREATIONAL VEHICLES HAVING AT LEAST ONE CRAWL SPACE

(71) Applicant: Thor Tech, Inc., Elkhart, IN (US)

(72) Inventor: Jeffrey M. Snyder, White Pigeon, MI (US)

(73) Assignee: Thor Tech, Inc., Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,091

(22) Filed: Nov. 30, 2022

(65) Prior Publication Data

US 2023/0091964 A1 Mar. 23, 2023

Related U.S. Application Data

(63) Continuation of application No. 17/220,197, filed on Apr. 1, 2021, now Pat. No. 11,667,230.

(60) Provisional application No. 63/003,461, filed on Apr. 1, 2020.

(51) Int. Cl.
| | |
|---|---|
| *B60P 3/36* | (2006.01) |
| *B62D 21/02* | (2006.01) |
| *B62D 21/16* | (2006.01) |

(52) U.S. Cl.
CPC .............. *B60P 3/36* (2013.01); *B62D 21/02* (2013.01); *B62D 21/16* (2013.01)

(58) Field of Classification Search
CPC ... B60P 3/36; B60P 3/08; B62D 21/16; B62D 21/18
USPC ........................................ 296/168, 156, 204
See application file for complete search history.

(56) References Cited

U.S. PATENT DOCUMENTS

| | | | | |
|---|---|---|---|---|
| 3,792,895 | A | * | 2/1974 | Paulson ............. B62D 25/2054 |
| | | | | 451/364 |
| 4,084,834 | A | | 4/1978 | Becker |
| 4,728,144 | A | * | 3/1988 | Crean ....................... B60P 3/32 |
| | | | | 296/156 |

(Continued)

FOREIGN PATENT DOCUMENTS

| | | |
|---|---|---|
| CN | 207737363 U | 8/2017 |
| EP | 2520461 A1 | 11/2012 |

OTHER PUBLICATIONS

Lord "How to build a Jayco Silverline" https://www.caravancampingsales.com.au/editorial/details/how-to-build-a-composite-caravan-115904/, Dec. 7, 2018, 18 pgs.

*Primary Examiner* — Amy R Weisberg
*Assistant Examiner* — Veronica M Shull
(74) *Attorney, Agent, or Firm* — Dinsmore & Shohl LLP

(57) ABSTRACT

A recreational vehicle may include a chassis, at least one axle assembly, and a vehicle body. The vehicle body may be supported by the chassis. The axle assembly may be coupled to the chassis and may provide motive support and underbody clearance to the chassis. The chassis may include a plurality of longitudinal main rails that span at least a portion of a length of the recreational vehicle and define a length of at least one crawl space. The plurality of lateral crawl space cross members may extend between and interconnect the plurality of longitudinal main rails and define a width of the at least one crawl space. A floor of the recreational vehicle, the plurality of longitudinal main rails, and the plurality of lateral crawl space cross members may collectively define the at least one crawl space.

32 Claims, 9 Drawing Sheets

(56) References Cited

U.S. PATENT DOCUMENTS

| | | | | |
|---|---|---|---|---|
| 4,784,545 | A | 11/1988 | Lawrence | |
| 5,314,205 | A * | 5/1994 | Glesmann | F28D 1/0408 |
| | | | | 280/783 |
| 5,501,504 | A * | 3/1996 | Kunz | B62D 25/2054 |
| | | | | 280/783 |
| 5,921,615 | A * | 7/1999 | Gimenez | B60P 3/32 |
| | | | | 280/783 |
| 6,231,115 | B1 | 5/2001 | Crean | |
| 7,097,232 | B2 * | 8/2006 | Beaudry | B62D 31/02 |
| | | | | 180/311 |
| 7,175,202 | B2 * | 2/2007 | Budica | B62D 21/02 |
| | | | | 280/781 |
| 7,240,945 | B1 | 7/2007 | Crean | |
| 7,967,338 | B1 * | 6/2011 | Anderson | B60P 3/36 |
| | | | | 280/789 |
| 8,876,160 | B2 * | 11/2014 | Olson | B62D 21/08 |
| | | | | 296/205 |
| 9,290,213 | B2 | 3/2016 | Connor | |
| 9,663,020 | B2 * | 5/2017 | Ehl | B60P 3/36 |
| 2015/0307145 | A1 | 10/2015 | Weissmann | |

\* cited by examiner

CHASSIS FOR RECREATIONAL VEHICLES HAVING AT LEAST ONE CRAWL SPACE

CROSS-REFERENCE TO RELATED APPLICATIONS

This application is a continuation of U.S. application Ser. No. 17/220,197, filed Apr. 1, 2021, which claims the benefit of U.S. Provisional Application Ser. No. 63/003,461, filed Apr. 1, 2020.

BACKGROUND

The present disclosure relates to recreational vehicles, and more particularly, to recreational vehicles with a chassis having at least one crawl space.

BRIEF SUMMARY

According to the subject matter of the present disclosure, recreational vehicles (RVs) including a chassis having at least one crawl space are provided. Contemplated recreational vehicles may include at least one crawl space that provides a chase or runway for the passage of heating, ventilation, and air conditioning (HVAC) parts, plumbing, wiring, or anything else that needs to be routed along the recreational vehicle.

Conventional recreational vehicles do not include a chassis having at least one crawl space. Accordingly, HVAC parts, plumbing, wiring, and other components that need to be routed along the recreational vehicle must be routed through the chassis or within the recreational vehicle. The areas between the main rails of a conventional recreational vehicles are not well insulated and are designed with numerous cutouts and perforations, which are difficult to seal and entirely insulate.

The present inventors have recognized that chassis of recreational vehicles may be constructed to provide at least one crawl space. The at least one crawl space may allow for HVAC parts, plumbing, wiring, and other components may be efficiently routed in the chase or runway of the at least one crawl space. The at least one crawl space may also be entirely insulated.

In accordance with one embodiment of the present disclosure, a recreational vehicle may include a chassis, at least one axle assembly, a vehicle body, and a composite floor. The composite floor may include an upper sheet and lower sheet bonded to a skeletal framework as a structurally integrated composite. The vehicle body and the composite floor may be supported by the chassis. The axle assembly may be coupled to the chassis and may provide motive support and underbody clearance to the chassis. The chassis may include a plurality of longitudinal main rails, a plurality of lateral crawl space cross members, at least one longitudinal floor support, and at least one insulation sheet. The composite floor, the plurality of longitudinal main rails, the plurality of lateral crawl space cross members, the at least one longitudinal floor support, and the at least one insulation sheet may collectively define at least one crawl space. Each of the at least one crawl space may have an upper surface defined by the composite floor, a bottom surface defined by the plurality of lateral crawl space cross members and the at least one insulation sheet, and sides defined by the at least one insulation sheet. The plurality of longitudinal main rails may span at least a portion of a length of the recreational vehicle and may define a length of the at least one crawl space. The plurality of lateral crawl space cross members may extend between and interconnect the plurality of longitudinal main rails and may define a width of the at least one crawl space. An upper face of the plurality of lateral crawl space cross members may be lower than an upper face of the plurality of longitudinal main rails. The at least one longitudinal floor support may be positioned between the composite floor and the plurality of lateral crawl space cross members. The at least one longitudinal floor support may be operable to provide support to the composite floor.

In accordance with another embodiment of the present disclosure, a recreational vehicle may include a chassis, at least one axle assembly, and a vehicle body. The composite floor may include an upper sheet, a lower sheet, and a foam core insert disposed between the upper and lower sheets as a structurally integrated composite. The vehicle body and the composite floor may be supported by the chassis. The axle assembly may be coupled to the chassis and may provide motive support and underbody clearance to the chassis. The chassis may include a plurality of longitudinal main rails, a plurality of lateral crawl space cross members, at least one longitudinal floor support, and at least one insulation sheet. The composite floor, the plurality of longitudinal main rails, the plurality of lateral crawl space cross members, the at least one longitudinal floor support, and the at least one insulation sheet may collectively define at least one crawl space. Each of the at least one crawl space may have an upper surface defined by the composite floor, a bottom surface defined by the plurality of lateral crawl space cross members and the at least one insulation sheet, and sides defined by the at least one insulation sheet, thereby providing the at least one crawl space with insulation above, below and to each side of the at least one crawl space. The plurality of longitudinal main rails may span at least a portion of a length of the recreational vehicle and may define a length of the at least one crawl space. The plurality of lateral crawl space cross members may extend between and interconnect the plurality of longitudinal main rails and may define a width of the at least one crawl space. An upper face of the plurality of lateral crawl space cross members may be lower than an upper face of the plurality of longitudinal main rails. The at least one longitudinal floor support may be positioned between the composite floor and the plurality of lateral crawl space cross members. The at least one longitudinal floor support may be operable to provide support to the composite floor.

In accordance with yet another embodiment of the present disclosure, a recreational vehicle may include a chassis, at least one axle assembly, a vehicle body, and a composite floor. The composite floor may include an upper sheet and lower sheet bonded to a skeletal framework as a structurally integrated composite. The vehicle body and the composite floor may be supported by the chassis. The axle assembly may be coupled to the chassis and may provide motive support and underbody clearance to the chassis. The chassis may include a plurality of longitudinal main rails, a plurality of lateral crawl space cross members, and at least one longitudinal floor support. The plurality of longitudinal main rails, the plurality of lateral crawl space cross members, and the at least one longitudinal floor support may collectively define at least one crawl space. The plurality of longitudinal main rails may span at least a portion of a length of the recreational vehicle and may define a length of the at least one crawl space. The plurality of lateral crawl space cross members may extend between and interconnect the plurality of longitudinal main rails and may define a width of the at least one crawl space. An upper face of the plurality of lateral crawl space cross members may be lower than an upper face of the plurality of longitudinal main rails. The at least one longitudinal floor support may include an upper surface, two vertical surfaces extending from the upper face, and a lower surface extending from the two vertical faces and substantially parallel to the upper face. The at least one longitudinal floor support may be positioned between the composite floor and the plurality of lateral crawl space cross members. The at least one longitudinal floor support may be operable to provide support to the composite floor. The at least one longitudinal floor support may be a hat channel.

In accordance with still another embodiment of the present disclosure, a recreational vehicle may include a chassis, at least one axle assembly, a vehicle body, a composite floor, and a climate control system with ductwork. The composite floor may include an upper sheet and lower sheet bonded to a skeletal framework as a structurally integrated composite. The vehicle body and the composite floor may be supported by the chassis. The axle assembly may be coupled to the chassis and may provide motive support and underbody clearance to the chassis. The chassis may include a plurality of longitudinal main rails, a plurality of lateral crawl space cross members, and at least one longitudinal floor support. The composite floor, the plurality of longitudinal main rails, the plurality of lateral crawl space cross members, the at least one longitudinal floor support, and the at least one insulation sheet may collectively define at least one crawl space. Each of the at least one crawl space may have an upper surface defined by the composite floor, a bottom surface defined by the plurality of lateral crawl space cross members, and sides defined by the plurality of longitudinal main rails or the at least one longitudinal floor support. The plurality of longitudinal main rails may span at least a portion of a length of the recreational vehicle and may define a length of the at least one crawl space. The plurality of lateral crawl space cross members may extend between and interconnect the plurality of longitudinal main rails and may define a width of the at least one crawl space. An upper face of the plurality of lateral crawl space cross members may be lower than an upper face of the plurality of longitudinal main rails. The at least one longitudinal floor support may be positioned between the composite floor and the plurality of lateral crawl space cross members. The at least one longitudinal floor support may be operable to provide support to the composite floor. At least a portion of the ductwork of the climate control system may include rigid ductwork that is routed in the at least one crawl space.

In accordance with yet another embodiment of the present disclosure, a recreational vehicle may include a chassis, at least one axle assembly, a vehicle body, a composite floor, and at least one holding tank. The vehicle body and the composite floor may be supported by the chassis. The axle assembly may be coupled to the chassis and may provide motive support and underbody clearance to the chassis. The chassis may include a plurality of longitudinal main rails, a plurality of lateral crawl space cross members, and at least one longitudinal floor support. The composite floor, the plurality of longitudinal main rails, the plurality of lateral crawl space cross members, and the at least one longitudinal floor support may collectively define at least one crawl space. Each of the at least one crawl space may have an upper surface defined by the composite floor, a bottom surface defined by the plurality of lateral crawl space cross members, and sides defined by the plurality of longitudinal main rails or the at least one longitudinal floor support. The plurality of longitudinal main rails may span at least a portion of a length of the recreational vehicle and may define a length of the at least one crawl space. The plurality of lateral crawl space cross members may extend between and interconnect the plurality of longitudinal main rails and may define a width of the at least one crawl space. An upper face of the plurality of lateral crawl space cross members may be lower than an upper face of the plurality of longitudinal main rails, thereby providing a holding tank receiving area defined below the at least one crawl space. The holding tank receiving area may be operable to receive and support the at least one holding tank. The at least one longitudinal floor support may be positioned between the composite floor, the plurality of lateral crawl space cross members, and the at least one holding tank. The at least one longitudinal floor support may be operable to provide support to the composite floor and to limit upward expansion of an upper surface of the at least one holding tank toward the composite floor.

Although the concepts of the present disclosure are described herein with primary reference to recreational vehicles, it is contemplated that the concepts will enjoy applicability to any type of vehicle. For example, and not by way of limitation, it is contemplated that the concepts of the present disclosure will enjoy applicability to all motor vehicles and non-motor vehicles.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

The present disclosure is directed to recreational vehicles having at least one crawl space. Components of the chassis may be arrange such as to provide at least one crawl space disposed below a body of the recreational vehicles. As used in the present disclosure, a "recreational vehicle" may refer to any motor vehicle or trailer which includes living quarters designed for accommodation. Types of recreational vehicles may include, but are not limited to, motorhomes, campervans, caravans (also known as travel trailers and camper trailers), fifth-wheel trailers, gooseneck trailers, popup campers, and truck campers. Recreational vehicles may also include toy haulers or car haulers. Recreational vehicles of the present disclosure may include in-frame or above-frame slide systems.

Figure 1:
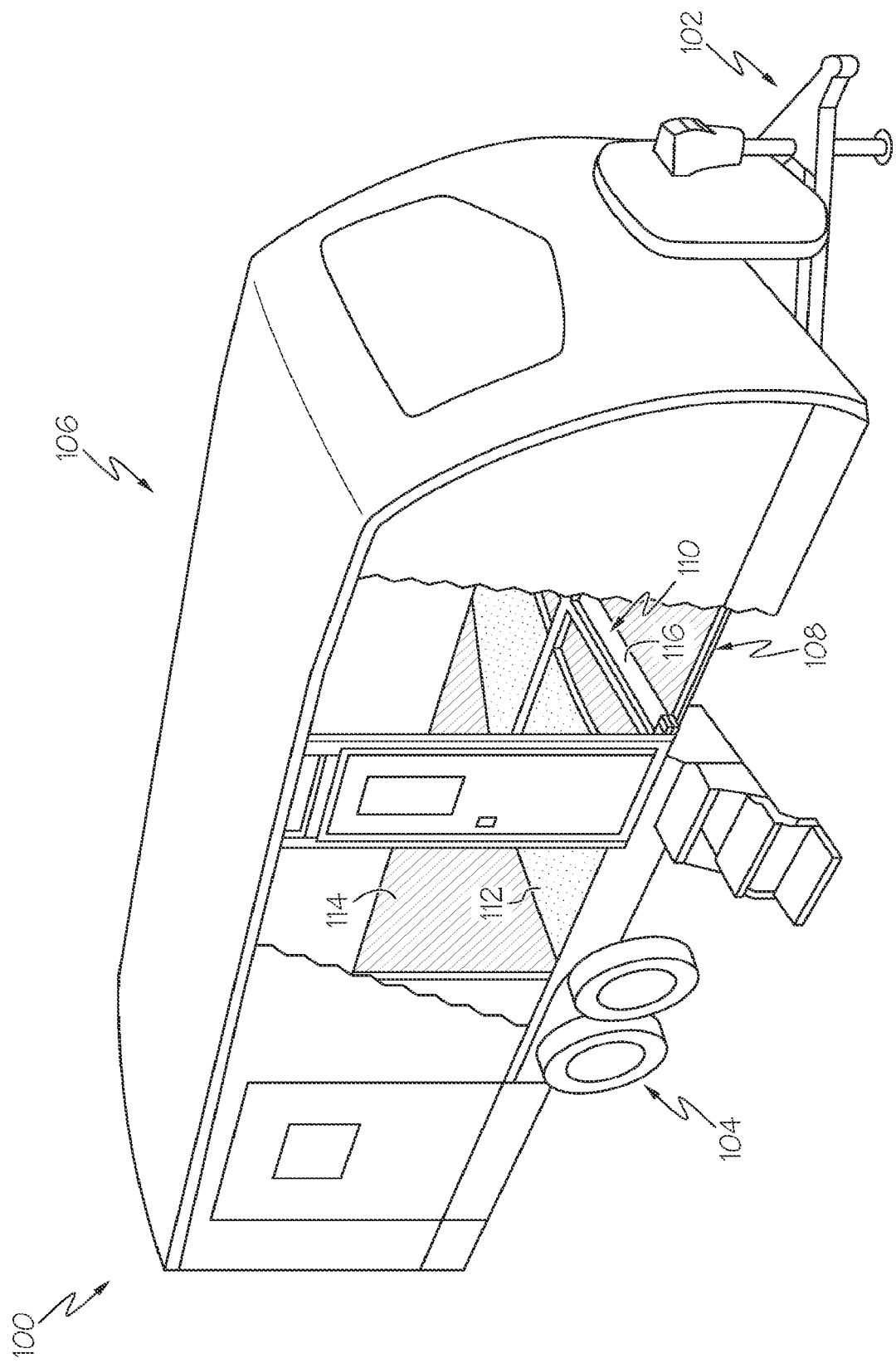
FIG. 1 is a schematic illustration of a recreational vehicle according to one embodiment of the present disclosure.

Referring initially to FIG. 1, a recreational vehicle 100 may include a chassis 102, at least one axle assembly 104, and a vehicle body 106. The vehicle body 106 may be supported by the chassis 102. The axle assembly 104 may be coupled to the chassis 102. The axle assembly 104 may provide motive support and underbody clearance to the chassis 102. With reference to FIGS. 2-5, the chassis 102 of the recreational vehicles 100 of the present disclosure may include at least one crawl space 201. The at least one crawl space 201 may be between the chassis 102 and a floor 108 of the recreational vehicle 100. The floor 108 of the recreational vehicle 100 may be supported by the chassis 102. The recreational vehicle 100 may include any other components recognized by those skilled in the art.

Figure 2:
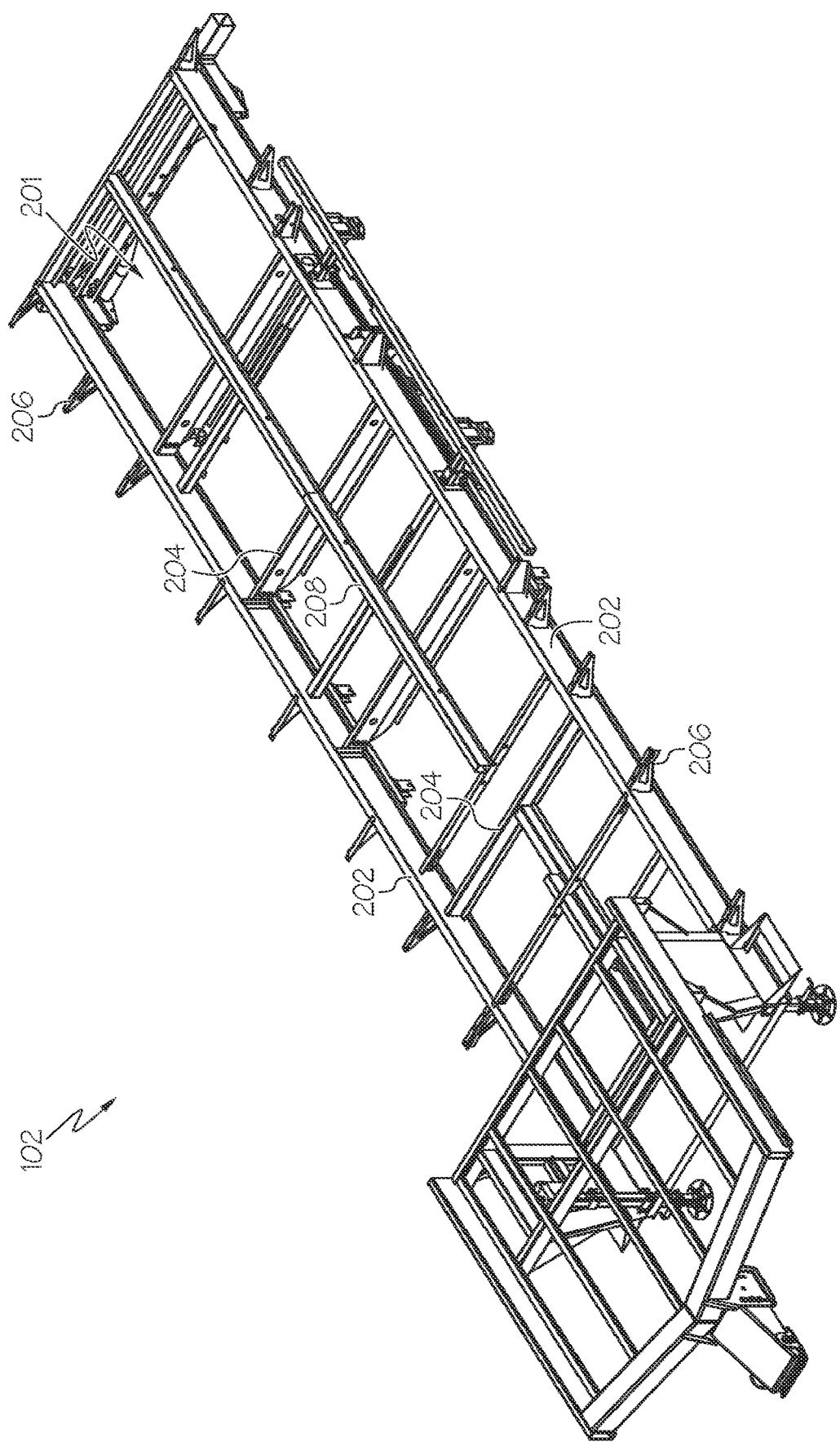
FIG. 2 is a schematic illustration of a chassis of a fifth wheel recreational vehicle according to one embodiment of the present disclosure.
Figure 3:
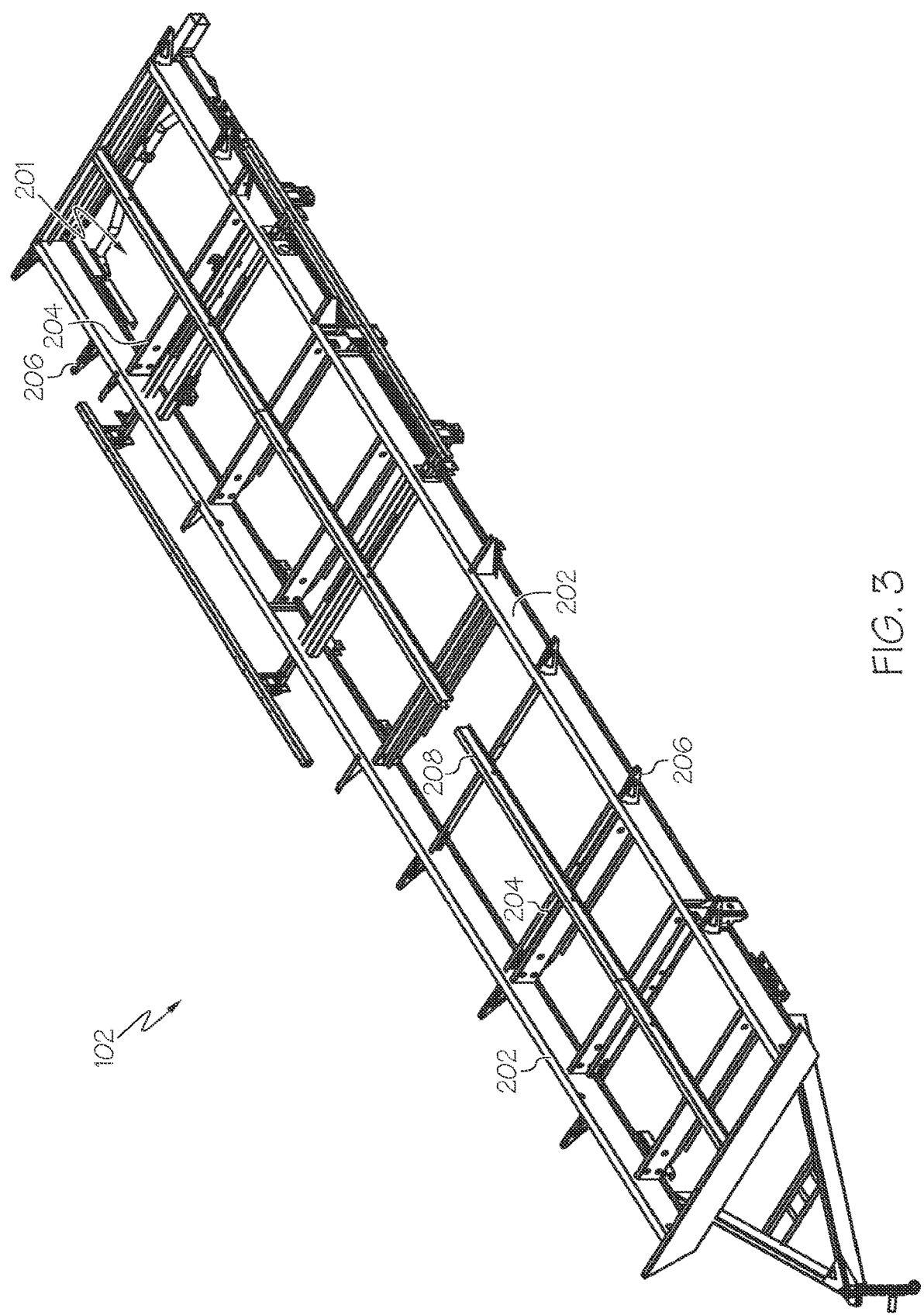
FIG. 3 is a schematic illustration of a chassis of a caravan recreational vehicle according to one embodiment of the present disclosure.

Referring now to FIGS. 2 and 3, the chassis 102 may include a plurality of longitudinal main rails 202 and a plurality of lateral crawl space cross members 204. The plurality of longitudinal main rails 202 may span at least a portion of a length of the recreational vehicle 100. In embodiments, the plurality of longitudinal main rails 202 may span the entire length of the recreational vehicle 100. The plurality of longitudinal main rails 202 may define a length of the at least one crawl space 201.

The plurality of lateral crawl space cross members 204 may extend between and interconnect the plurality of longitudinal main rails 202. The plurality of lateral crawl space cross members 204 may connect to the plurality of longitudinal main rails 202 using any conventional or yet-to-be developed means of connection. For example, the plurality of lateral crawl space cross members 204 may connect to the plurality of longitudinal main rails 202 using hardware (nuts, bolts, etc.), riveting, welding, or brazing. Those skilled in the art will recognize various methods that may be used to connect the plurality of lateral crawl space cross members 204 and the plurality of longitudinal main rails 202. The plurality of lateral crawl space cross members 204 may define a width of the at least one crawl space 201. The plurality of lateral space crawl members 204 may be spaced intermittently along a length of the recreational vehicle 100. For example, the plurality of lateral space crawl members 204 may be spaced from 0 inches (0.0 centimeters (cm)) to 48 inches (122 cm) apart, such as from 2 inches (5.1 cm) to 48 inches (122 cm). It is contemplated that two or more of the plurality of longitudinal main rails 202 may be side-by-side. That is, two or more of the plurality of longitudinal main rails 202 may be sistered together. Two or more of the plurality of longitudinal main rails 202 may be side-by-side where extra strength or support is needed in the chassis 102. Each of the plurality of lateral crawl space cross members 204 may be spaced uniformly or non-uniformly apart along a length of the recreational vehicle 100.

Figure 4:
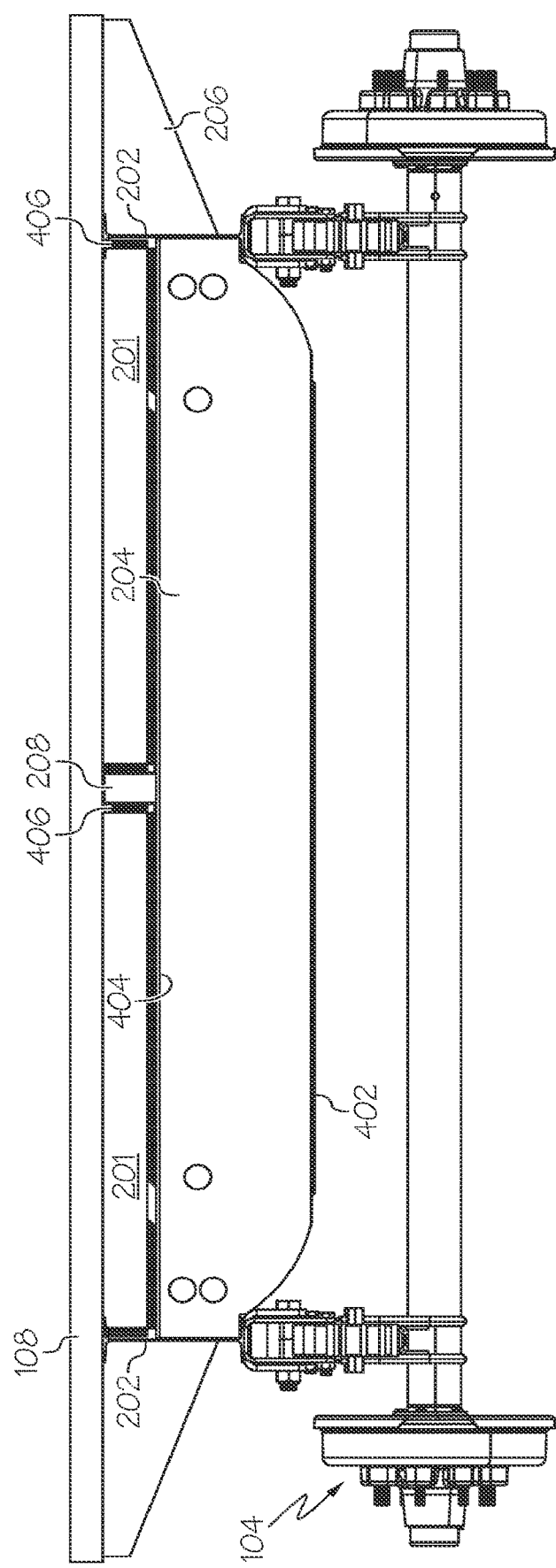
FIG. 4 is a schematic illustration of a cross-sectional view of a recreational vehicle and at least one crawl space according to one embodiment of the present disclosure.
Figure 8B:
FIG. 8B is a schematic illustration of a cross-sectional view of a lateral crawl space cross member according to one embodiment of the present disclosure.
Figure 8A:
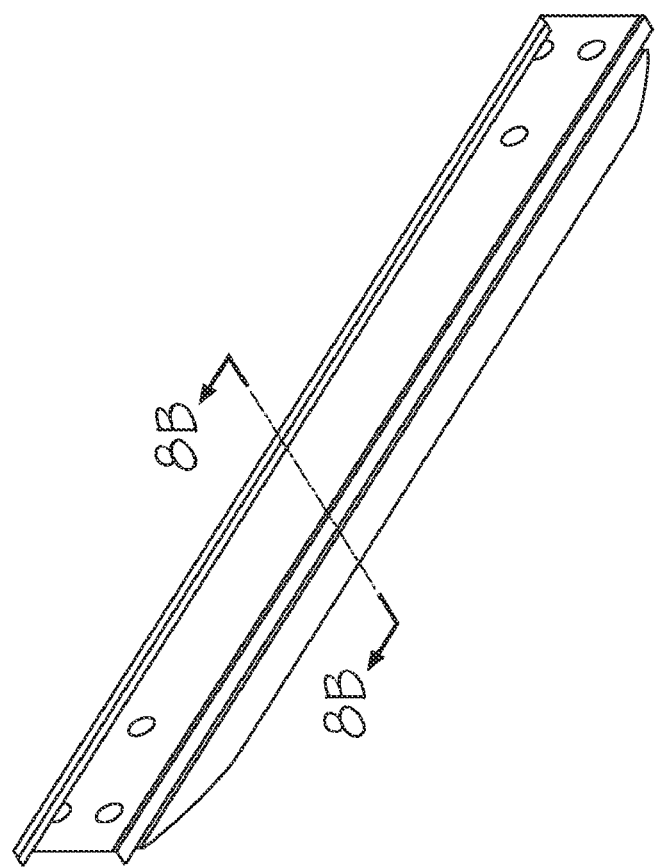
FIG. 8A is a schematic illustration of a lateral crawl space cross member according to one embodiment of the present disclosure.

Referring to FIG. 4, the plurality of lateral crawl space cross members 204 may include a lower face 402 having a convex shape. The convex shape of the lower face 402 of the plurality of lateral crawl space cross members 204 may provide the necessary structural integrity to the chassis 102 of the recreational vehicle 100. The convex shape on the lower face 402 of the plurality of lateral crawl space cross members 204 may allow components, such as holding tanks, as further described herein, to be installed below the at least one crawl space 201. As shown in FIGS. 8A and 8B, the plurality of lateral crawl space cross members 204 may comprise a z-shape. The plurality of lateral crawl space cross members 204 may include a first vertical surface 802 extending from an upper face of the plurality of lateral crawl space cross members 204. The plurality of lateral crawl space cross members 204 may include a second vertical surface 804 extending from the lower face 402. The first vertical surface 802 and the second vertical surface 804 may be connected by a transition surface 806. Each of the lower face 402, the upper face 404, the first vertical surface 802, the second vertical surface 804, and the transition surface 806 may be in direct contact with one another in the arrangement previously described. The first vertical surface 802 and the second vertical surface 804 may be substantially parallel, but offset by the transition surface 806. Together, the lower face 402, the upper face 404, the first vertical surface 802, the second vertical surface 804, and the transition surface 806 may form a z-shape.

Figure 9:
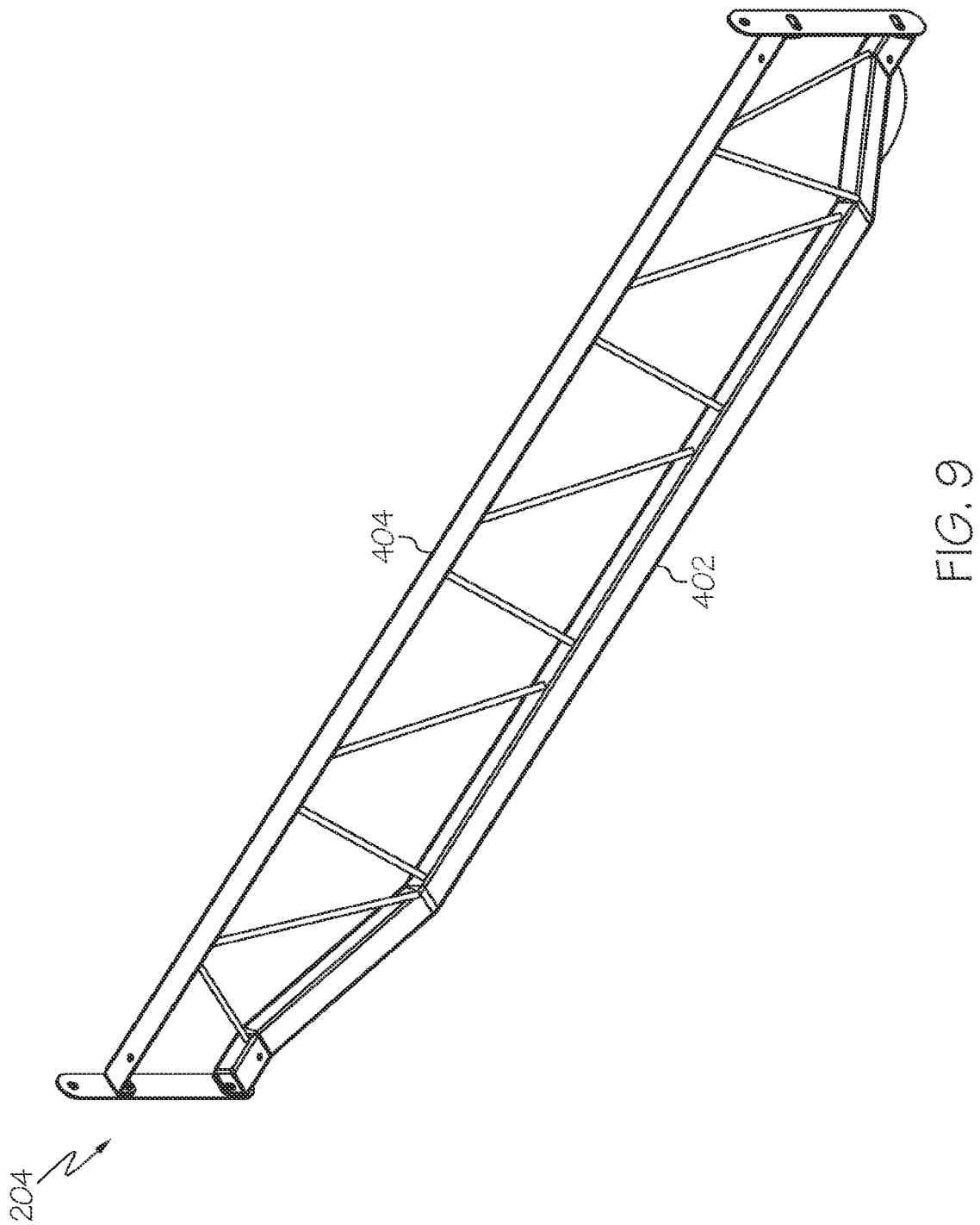
FIG. 9 is a schematic illustration of a lateral crawl space cross member according to another embodiment of the present disclosure.

Referring now to FIG. 9, another embodiment of one of the plurality of lateral crawl space cross members 204 is schematically depicted. The lateral crawl space cross members 204 the lower face 402 and the upper face 404 as previously described in the present disclosure. The lower face 402 of the lateral crawl space cross member 204 in FIG. 9 also comprises a convex shape that may provide the necessary structural integrity to the chassis 102 of the recreational vehicle 100. The convex shape on the lower face 402 of the plurality of lateral crawl space cross members 204 as shown in FIG. 9 may allow components, such as holding tanks, as further described herein, to be installed below the at least one crawl space 201.

Referring again to FIG. 4, the upper face 404 of the plurality of lateral crawl space cross members 204 may be lower than an upper face 210 of the plurality of longitudinal main rails 202. The distance between the upper face 404 of the plurality of lateral crawl space cross members 204 from the upper face 210 of the plurality of longitudinal main rails 202 may define a height of the at least one crawl space 201. The at least one crawl space 201 may have a height greater than 2 inches (5.1 cm). In embodiments, the at least one crawl space 201 may have a height ranging from 2 inches (5.1 cm) to 24 inches (61.0 cm), such as from 3 (7.6 cm) inches to 12 inches (30.5 cm) or from 3 inches (7.6 cm) to 6 inches (15.2 cm).

Referring to FIGS. 2-5, the chassis 102 may include a plurality of outriggers 206. The plurality of outriggers 206 may extend laterally outward from the plurality of longitudinal main rails 202. The outriggers 206 may support an outer periphery of the floor 108 of the recreational vehicle 100. The plurality of longitudinal main rails 202 may be positioned inside wheel wells of the at least one axle assembly 104. The plurality of outriggers 206 may provide support such that the area of the floor 108 of the recreational vehicle 100 may be increased wider than a distance between the plurality of longitudinal main rails 202. The plurality of outriggers 206 each may each include outer ends interconnected only by the floor 108. More specifically, the plurality of outriggers 206 may not be connected, such as by one or more pieces of angle iron.

Referring to FIGS. 2-5, in embodiments, the chassis 102 may include at least one longitudinal floor support 208. The at least one longitudinal floor support 208 may be positioned between the floor 108 of the recreational vehicle 100 and the plurality of lateral crawl space cross members 204. The at least one longitudinal floor support 208 may provide support to the floor 108. The at least one longitudinal floor support 208 may be positioned between the floor 108 and upper faces 404 of the plurality of lateral crawl space cross members 204. The at least one longitudinal floor support 208 may be constructed from a metal or non-metal. For example, the at least one longitudinal floor support 208 may be a metal pipe or tube. In embodiments, the at least one longitudinal floor support 208 may be wood.

The at least one longitudinal floor support 208 may provide additional contact points for the floor 108 of the recreational vehicle 100 to be attached. Floors 108 of recreational vehicles 100 benefit from being fixed to the chassis 102 in the middle of the floor of the recreational vehicle 100. In conventional recreational vehicles, the floor may be attached to the middle of the conventional chassis only where conventional chassis cross members are positioned. Due to components positioned between the conventional chassis cross members of conventional recreational vehicles, floors of conventional recreational vehicles may only be fixed to the conventional chassis on an intermittent basis, and sometimes only at intervals of, such as, 48 inches (122 centimeters). Conversely, the at least one longitudinal floor support 208 of the recreational vehicles 100 of the present disclosure may allow the middle of the floor 108 to be attached to the chassis 102 at much more frequent intervals. This may reduce the distance the floor must span unsupported to, in one example, 32.25 inches (81.92 cm), and in a further example, in the range of 28 (71.12 cm) to 36 inches (91.44 cm).

Figure 6:
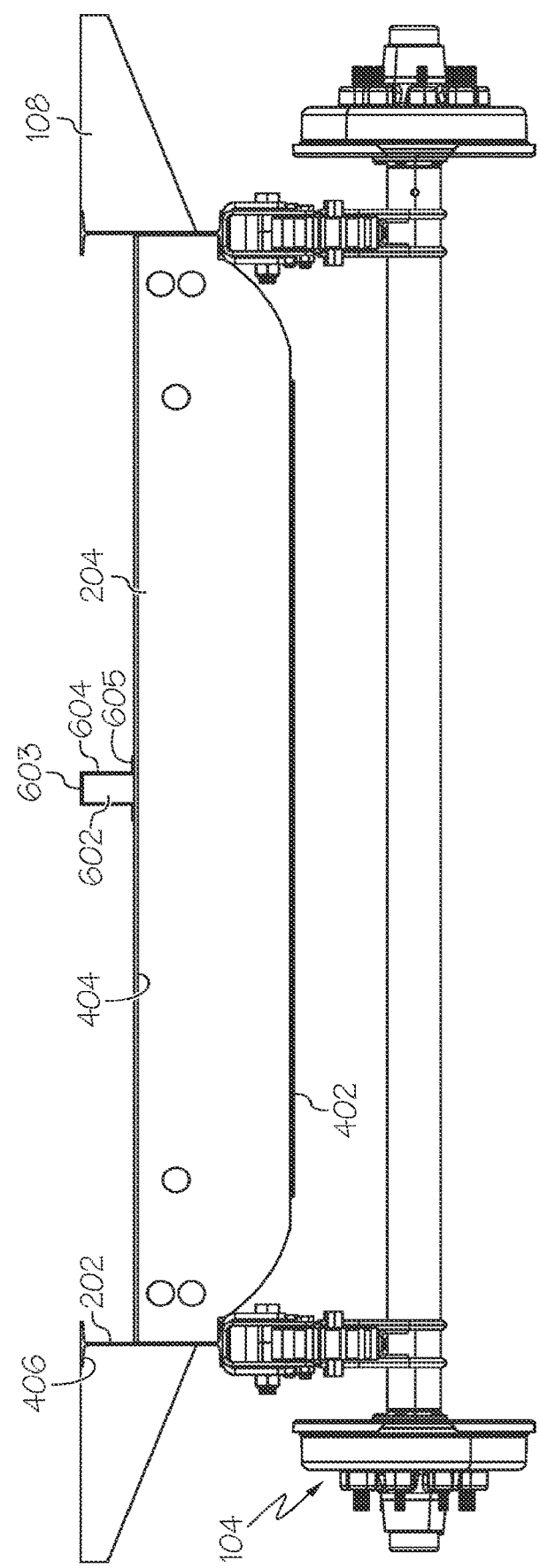
FIG. 6 is a schematic illustration of still another cross-sectional view of a recreational vehicle and at least one crawl space according to one embodiment of the present disclosure.

Referring to FIG. 6, in embodiments, the at least one longitudinal floor support 208 may comprise a hat channel 602. The hat channel may include an upper surface 603, two vertical surfaces 604 extending from the upper surface 603, and a lower surface 605 extending from the two vertical surfaces 604 and substantially parallel to the upper surface 603. In embodiments, the at least one longitudinal floor support 208 may be a single continuous longitudinal floor support 208 that may extend the entire length of the at least one crawl space 201. Alternatively, the at least one longitudinal floor support 208 may be a single discontinuous longitudinal floor support 208 that may extend the entire length of the at least one crawl space 201. In embodiments where the longitudinal floor support 208 is discontinuous, as shown in FIGS. 2 and 3, this may allow side-to-side passage from one crawl space 201 to another crawl space 201.

Referring again to FIG. 1, embodiments of the at least one crawl space 201 of the present disclosure may be incorporated into conventional floor systems or laminate floor systems. Conventional stick built floor systems may be constructed from multiple pieces of dimensional lumber or metal and may be placed on top of the chassis 102. Laminate floor systems, such as the composite floor further described in the present disclosure, may also be placed on top of the chassis 102 but do not require the multiple pieces of dimensional lumber or metal.

In embodiments, the floor 108 of the recreational vehicle 100 may be a composite floor. As used in the present disclosure, a "composite floor" may refer to a non-conventional floor, such as floors constructed from multiple pieces of dimensional lumber in a frame. The composite floor may be supported by the chassis 102. In embodiments, the composite floor may comprise an upper sheet 114 and lower sheet 116 bonded to a skeletal framework 110. Together, the upper sheet 114, the lower sheet 116, and the skeletal framework 110 may form a structurally integrated composite. In embodiments, the composite floor may include a foam core insert 112 disposed between the upper sheet 114 and lower sheet 116. Together, the upper sheet 114, the lower sheet 116, the skeletal framework 110, and the foam core insert 112 may form a structurally integrated composite. Additional details of an example composite floor may be found U.S. patent application Ser. No. 16/815,780, which is incorporated by reference herein.

Figure 7:
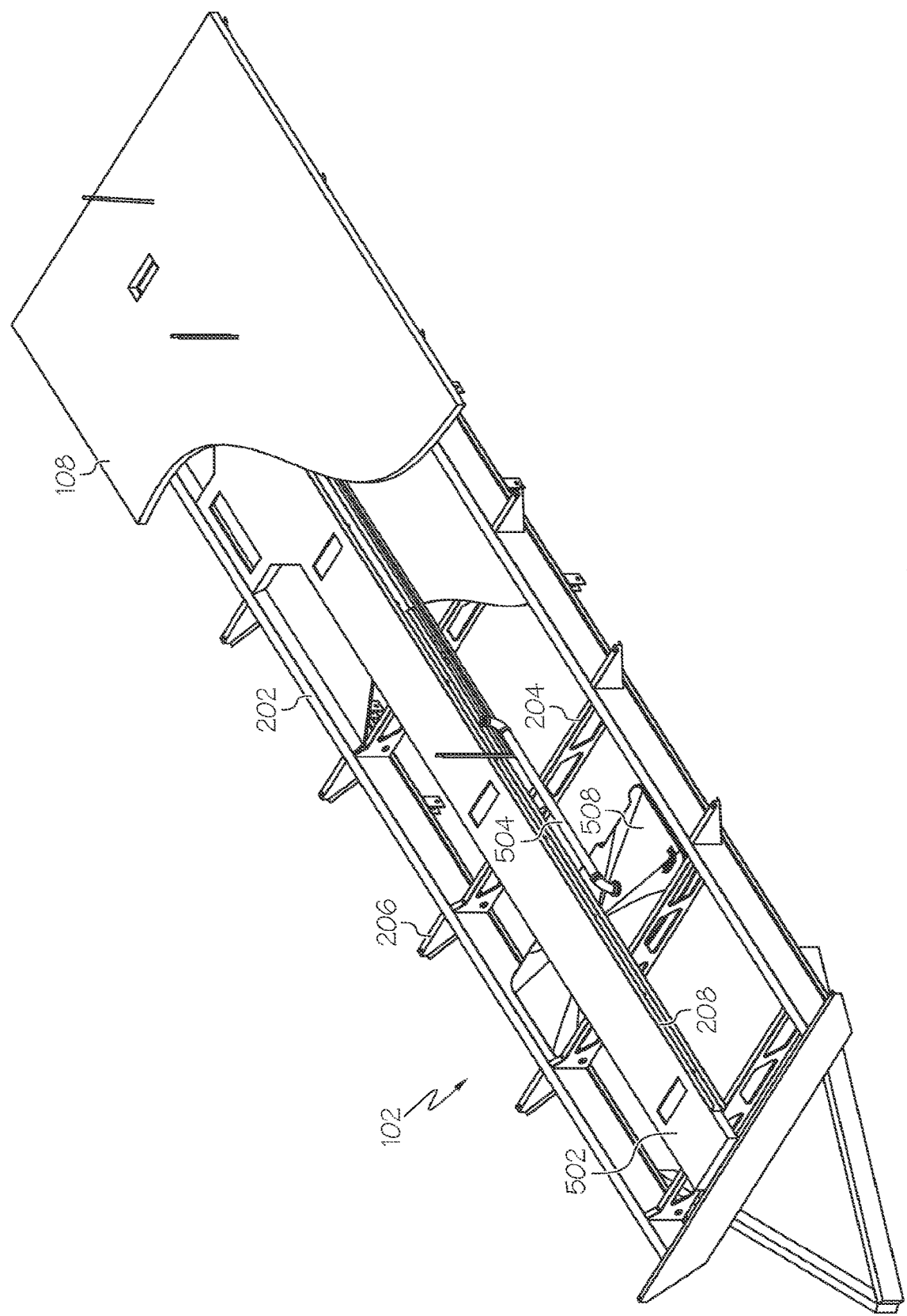
FIG. 7 is a schematic illustration of a recreational vehicle and at least one crawl space according to one embodiment of the present disclosure.

Referring again to FIGS. 4 and 5, in embodiments, the chassis 102 of the recreational vehicle 100 may include at least one insulation sheet 406. The at least one insulation sheet 406 may line an inner surface of the plurality of longitudinal main rails 202, sides of the at least one longitudinal floor support 208, an upper face 404 of the plurality of lateral crawl space cross members 204, or combinations thereof. The at least one insulation sheet 406 may span gaps between the plurality of lateral crawl space cross members 204. The at least one insulation sheet 406 may be an insulating foam board. The at least one insulation sheet 406 may be wider than the at least one crawl space 201. In embodiments, the at least one insulation sheet 406 may be scored or cut such that the at least one insulation sheet 406 may be folded. The at least one insulation sheet 406 may be folded such that the at least one insulation sheet 406 covers the bottom surface of the at least one crawl space 201 and sides of the at least one crawl space 201. The at least one insulation sheet 406 may be folded to additionally cover the upper surface of the at least one crawl space 201. Additionally or alternatively, a plurality of insulation sheets 406 may be used to cover the bottom surface, the sides, the upper surface, or combinations of these of the at least one crawl space 201. As shown in FIG. 7, the insulation sheet 406 may form a trough, such as a shape defining the bottom and sides of the at least one crawl space 201.

Figure 5:
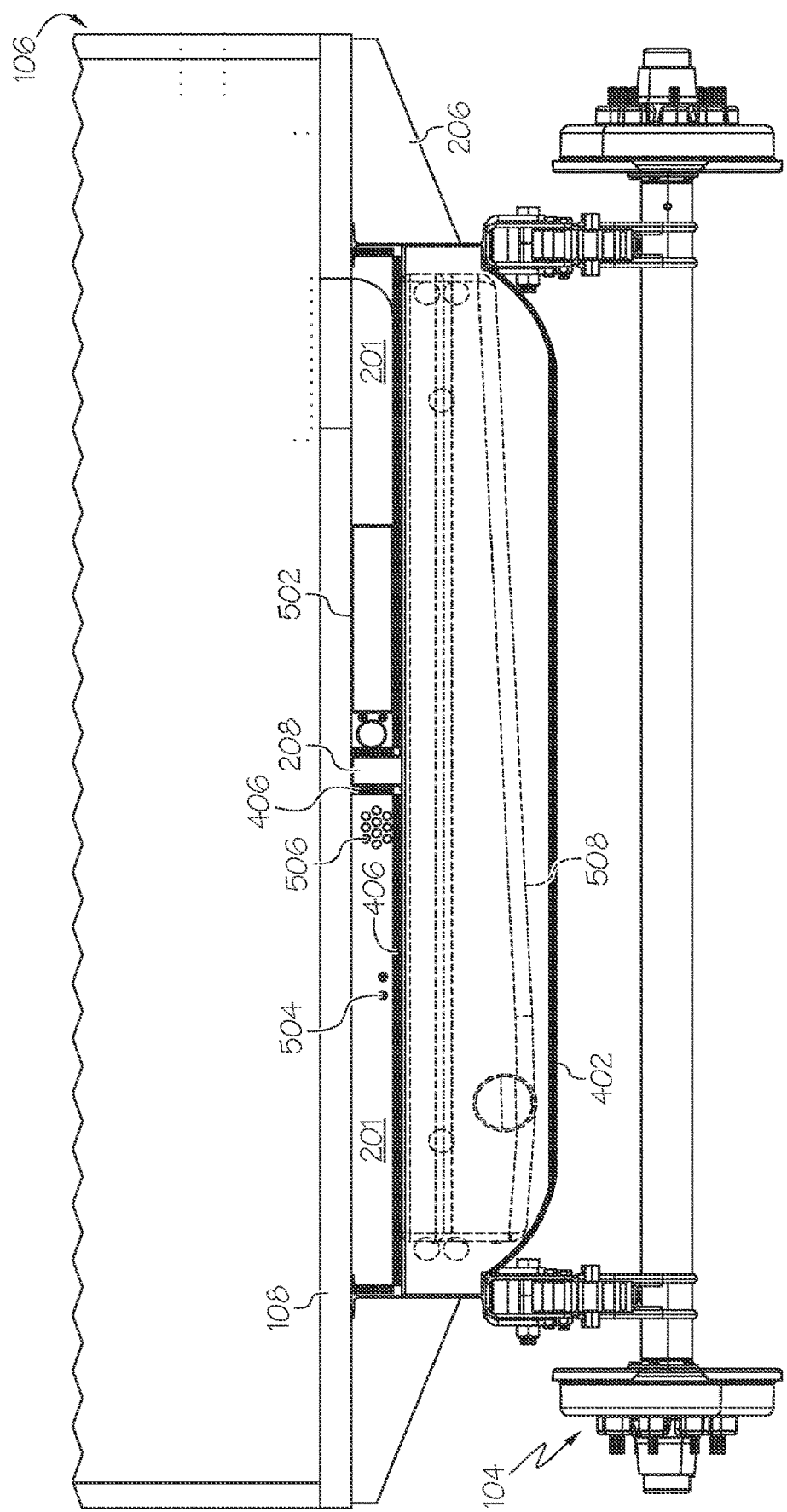
FIG. 5 is a schematic illustration of another cross-sectional view of a recreational vehicle and at least one crawl space according to one embodiment of the present disclosure.

Referring again to FIGS. 2 and 3, in embodiments, the at least one crawl space 201 of the recreational vehicle 100 may extend the entire length of the recreational vehicle 100. In other embodiments, the at least one crawl space 201 of the recreational vehicle 100 may extend the entire length of the vehicle body recreational vehicle 100, such as the length of the recreational vehicle minus the portion of the recreational vehicle including the hitch. As shown in FIG. 5, the at least one crawl space 201 may provide a space between the vehicle body 106 and the upper face 404 of the plurality of lateral crawl space cross members 204 to provide a chase or runway for the passage of HVAC ductwork 502, plumbing components 504, wiring 506, or anything else that needs to be routed along the recreational vehicle 100 and protected from the elements. Referring again to FIGS. 2 and 3, in embodiments, the at least one crawl space 201 may comprise one crawl space 201 or two crawl spaces 201. It is contemplated that any number of longitudinal floor supports 208 may be used to define any number of crawl spaces 201.

In one embodiment, the composite floor, the plurality of longitudinal main rails 202, the plurality of lateral crawl space cross members 204, the at least one longitudinal floor support 208, and the at least one insulation sheet 406 collectively define the at least one crawl space 201. Each of the at least one crawl space 201 may include an upper surface defined by the composite floor. Each of the at least one crawl space 201 may include a bottom surface defined by upper faces 404 of the plurality of lateral crawl space cross members 204 and the at least one insulation sheet 406. Each of the at least one crawl space 201 may include sides defined by the at least one insulation sheet 406.

In another embodiment, the composite floor, the plurality of longitudinal main rails 202, the plurality of lateral crawl space cross members 204, the at least one longitudinal floor support 208, and the at least one insulation sheet 406 collectively define the at least one crawl space 201. Each of the at least one crawl space 201 may include an upper surface defined by the composite floor. Each of the at least one crawl space 201 may include a bottom defined by the upper faces 404 of the plurality of lateral crawl space cross members 204 and the at least one insulation sheet 406. Each of the at least one crawl space 201 may include sides defined by the at least one insulation sheet 406. In such an embodiment, the at least one crawl space 201 may include insulation above, below and to each side of the at least one crawl space 201.

Referring to FIGS. 5 and 7, in embodiments, the recreational vehicle 100 may include a climate control system with ductwork 502. The climate control system may provide heat or air conditioning from a heating or air conditioning unit (not shown) to the vehicle body 106 via the ductwork 502. At least a portion of the ductwork 502 of the climate control system may include rigid ductwork 502 that is routed in the at least one crawl space 201. The ductwork 502 may be non-insulated. As used in the present disclosure, "non-insulated" means that the ductwork 502 is made of traditional duct materials and that no insulation is applied to an inner or outer surface of the ductwork 502. The ductwork 502 may be formed from sheet metal. The sheet metal may be galvanized steel or aluminum. The ductwork 502 may be residential type ductwork 502 as opposed to flexible ductwork. One skilled in the art will appreciate the advantages to using residential type ductwork 502 as opposed to flexible ductwork. Flexible ductwork may be pinched, crushed, or torn which may result in an inefficient climate control system. Residential type ductwork 502 may provide efficient heating and cooling to the vehicle body 106.

The climate control system in the at least one crawl space 201 may define a supply duct and a return plenum. The ductwork 502 of the climate control system may be the supply duct and a remaining area in the at least one crawl space 201 being the return plenum. The ductwork 502 may be spaced away from one side of the at least one crawl space 201, either one of the longitudinal main rails 202 or the at least one longitudinal floor support 208, such that space remains in the at least one supply duct for the return plenum. In embodiments where the ductwork 502 is non-insulated, any heat lost from the ductwork (i.e., the supply duct) goes to the return air. Therefore, heat lost from the ductwork 502 (i.e., the supply duct) may not be lost from the climate control system.

Still referring to FIGS. 5 and 7, in embodiments, the recreational vehicle 100 may comprise at least one holding tank 508 (illustrated in dashed lines in FIG. 5). The at least one holding tank 508 may store, for example, potable water, non-potable water, waste, or any other fluid. As previously described in the present disclosure, the plurality of lateral crawl space cross members 204 extend between and interconnect the plurality of longitudinal main rails 202 and define a width of the at least one crawl space 201. Also, as previously described in the present disclosure, the upper face 404 of the plurality of lateral crawl space cross members 204 may be lower than the upper face 210 of the plurality of longitudinal main rails 202. This arrangement of the plurality of lateral crawl space cross members 204 and the plurality of longitudinal main rails 202 may provide a holding tank receiving area defined below the at least one crawl space 201. The holding tank receiving area may comprise an area below the at least one longitudinal floor support 208, between a pair of the plurality of longitudinal main rails 202, and between a pair of the plurality of lateral crawl space cross members 204. The holding tank receiving area may receive and support the at least one holding tank 508.

The at least one longitudinal floor support 208, which may be positioned between the floor 108, the plurality of lateral crawl space cross members 204, and the at least one holding tank 508 may, in addition to providing support to the floor 108, limit upward expansion of an upper surface of the at least one holding tank 508 toward the floor 108. As holding tanks 508 are filled, the holding tanks 508 may expand upwards and exert pressure on the floor 108, which may deform the floor 108. The at least one longitudinal floor support 208 may provide resistance such that upward expansion of the at least one holding tank 508 toward the floor 108 may be limited or reduced.

One or more aspects of the present disclosure are described here. A first aspect of the present disclosure may include a recreational vehicle comprising a chassis, at least one axle assembly, a vehicle body, and a composite floor. The composite floor may comprise an upper sheet and lower sheet bonded to a skeletal framework as a structurally integrated composite. The vehicle body and the composite floor may be supported by the chassis. The axle assembly may be coupled to the chassis and may provide motive support and underbody clearance to the chassis. The chassis may comprise a plurality of longitudinal main rails, a plurality of lateral crawl space cross members, at least one longitudinal floor support, and at least one insulation sheet. The composite floor, the plurality of longitudinal main rails, the plurality of lateral crawl space cross members, the at least one longitudinal floor support, and the at least one insulation sheet may collectively define at least one crawl space. Each of the at least one crawl space may have an upper surface defined by the composite floor, a bottom surface defined by the plurality of lateral crawl space cross members and the at least one insulation sheet, and sides defined by the at least one insulation sheet. The plurality of longitudinal main rails may span at least a portion of a length of the recreational vehicle and may define a length of the at least one crawl space. The plurality of lateral crawl space cross members may extend between and interconnect the plurality of longitudinal main rails and may define a width of the at least one crawl space. An upper face of the plurality of lateral crawl space cross members may be lower than an upper face of the plurality of longitudinal main rails. The at least one longitudinal floor support may be positioned between the composite floor and the plurality of lateral crawl space cross members. The at least one longitudinal floor support may be operable to provide support to the composite floor.

A second aspect of the present disclosure may include a recreational vehicle having a chassis, at least one axle assembly, and a vehicle body. The composite floor may include an upper sheet, a lower sheet, and a foam core insert disposed between the upper and lower sheets as a structurally integrated composite. The vehicle body and the composite floor may be supported by the chassis. The axle assembly may be coupled to the chassis and may provide motive support and underbody clearance to the chassis. The chassis may include a plurality of longitudinal main rails, a plurality of lateral crawl space cross members, at least one longitudinal floor support, and at least one insulation sheet. The composite floor, the plurality of longitudinal main rails, the plurality of lateral crawl space cross members, the at least one longitudinal floor support, and the at least one insulation sheet may collectively define at least one crawl space. Each of the at least one crawl space may have an upper surface defined by the composite floor, a bottom surface defined by the plurality of lateral crawl space cross members and the at least one insulation sheet, and sides defined by the at least one insulation sheet, thereby providing the at least one crawl space with insulation above, below and to each side of the at least one crawl space. The plurality of longitudinal main rails may span at least a portion of a length of the recreational vehicle and may define a length of the at least one crawl space. The plurality of lateral crawl space cross members may extend between and interconnect the plurality of longitudinal main rails and may define a width of the at least one crawl space. An upper face of the plurality of lateral crawl space cross members may be lower than an upper face of the plurality of longitudinal main rails. The at least one longitudinal floor support may be positioned between the composite floor and the plurality of lateral crawl space cross members. The at least one longitudinal floor support may be operable to provide support to the composite floor.

A third aspect of the present disclosure may include a recreational vehicle having a chassis, at least one axle assembly, a vehicle body, a composite floor, and a climate control system with ductwork. The composite floor may include an upper sheet and lower sheet bonded to a skeletal framework as a structurally integrated composite. The vehicle body and the composite floor may be supported by the chassis. The axle assembly may be coupled to the chassis and may provide motive support and underbody clearance to the chassis. The chassis may include a plurality of longitudinal main rails, a plurality of lateral crawl space cross members, and at least one longitudinal floor support. The composite floor, the plurality of longitudinal main rails, the plurality of lateral crawl space cross members, the at least one longitudinal floor support, and the at least one insulation sheet may collectively define at least one crawl space. Each of the at least one crawl space may have an upper surface defined by the composite floor, a bottom surface defined by the plurality of lateral crawl space cross members, and sides defined by the plurality of longitudinal main rails or the at least one longitudinal floor support. The plurality of longitudinal main rails may span at least a portion of a length of the recreational vehicle and may define a length of the at least one crawl space. The plurality of lateral crawl space cross members may extend between and interconnect the plurality of longitudinal main rails and may define a width of the at least one crawl space. An upper face of the plurality of lateral crawl space cross members may be lower than an upper face of the plurality of longitudinal main rails. The at least one longitudinal floor support may be positioned between the composite floor and the plurality of lateral crawl space cross members. The at least one longitudinal floor support may be operable to provide support to the composite floor. At least a portion of the ductwork of the climate control system may include rigid ductwork that is routed in the at least one crawl space.

A fourth aspect may of the present disclosure may include any one of the first through third aspects, wherein the at least one insulation sheet lines an inner surface of the plurality of longitudinal main rails, sides of the at least one longitudinal floor support, and an upper face of the plurality of lateral crawl space cross members, the at least one insulation sheet spanning gaps between the plurality of lateral crawl space cross members.

A fifth aspect may of the present disclosure may include either the third or fourth aspect, wherein the ductwork is non-insulated.

A sixth aspect of the present disclosure may include any one of the third through fifth aspects, wherein the climate control system in the at least one crawl space defines a supply duct and a return plenum, the ductwork of the climate control system being the supply duct and a remaining area in the at least one crawl space being the return plenum.

A seventh aspect of the present disclosure may include a recreational vehicle having a chassis, at least one axle assembly, a vehicle body, a composite floor, and at least one holding tank. The vehicle body and the composite floor may be supported by the chassis. The axle assembly may be coupled to the chassis and may provide motive support and underbody clearance to the chassis. The chassis may include a plurality of longitudinal main rails, a plurality of lateral crawl space cross members, and at least one longitudinal floor support. The composite floor, the plurality of longitudinal main rails, the plurality of lateral crawl space cross members, and the at least one longitudinal floor support may collectively define at least one crawl space. Each of the at least one crawl space may have an upper surface defined by the composite floor, a bottom surface defined by the plurality of lateral crawl space cross members, and sides defined by the plurality of longitudinal main rails or the at least one longitudinal floor support. The plurality of longitudinal main rails may span at least a portion of a length of the recreational vehicle and may define a length of the at least one crawl space. The plurality of lateral crawl space cross members may extend between and interconnect the plurality of longitudinal main rails and may define a width of the at least one crawl space. An upper face of the plurality of lateral crawl space cross members may be lower than an upper face of the plurality of longitudinal main rails, thereby providing a holding tank receiving area defined below the at least one crawl space. The holding tank receiving area may be operable to receive and support the at least one holding tank. The at least one longitudinal floor support may be positioned between the composite floor, the plurality of lateral crawl space cross members, and the at least one holding tank. The at least one longitudinal floor support may be operable to provide support to the composite floor and to limit upward expansion of an upper surface of the at least one holding tank toward the composite floor.

An eighth aspect may of the present disclosure may include the seventh aspect, wherein the holding tank receiving area comprises an area below the at least one longitudinal floor support, between a pair of the plurality of longitudinal main rails, and between a pair of the plurality of lateral crawl space cross members.

A ninth aspect may of the present disclosure may include any one of the first through eighth aspects, wherein the at least one longitudinal floor support comprises a hat channel having an upper surface, two vertical surfaces extending from the upper surface, and a lower surface extending from the two vertical surfaces and substantially parallel to the upper surface.

A tenth aspect of the present disclosure may include a recreational vehicle having a chassis, at least one axle assembly, a vehicle body, and a composite floor. The composite floor may include an upper sheet and lower sheet bonded to a skeletal framework as a structurally integrated composite. The vehicle body and the composite floor may be supported by the chassis. The axle assembly may be coupled to the chassis and may provide motive support and underbody clearance to the chassis. The chassis may include a plurality of longitudinal main rails, a plurality of lateral crawl space cross members, and at least one longitudinal floor support. The plurality of longitudinal main rails, the plurality of lateral crawl space cross members, and the at least one longitudinal floor support may collectively define at least one crawl space. The plurality of longitudinal main rails may span at least a portion of a length of the recreational vehicle and may define a length of the at least one crawl space. The plurality of lateral crawl space cross members may extend between and interconnect the plurality of longitudinal main rails and may define a width of the at least one crawl space. An upper face of the plurality of lateral crawl space cross members may be lower than an upper face of the plurality of longitudinal main rails. The at least one longitudinal floor support may include an upper surface, two vertical surfaces extending from the upper surface, and a lower surface extending from the two vertical surfaces and substantially parallel to the upper surface. The at least one longitudinal floor support may be positioned between the composite floor and the plurality of lateral crawl space cross members. The at least one longitudinal floor support may be operable to provide support to the composite floor. The at least one longitudinal floor support may be a hat channel.

An eleventh aspect of the present disclosure may include any one of the first through tenth aspects, wherein the at least one crawl space extends the entire length of the recreational vehicle.

A twelfth aspect of the present disclosure may include any one of the first through eleventh aspects, wherein the chassis further comprise a plurality of outriggers extending from the plurality of longitudinal main rails, the plurality of outriggers operable to support an outer periphery of the composite floor.

A thirteenth aspect of the present disclosure may include the first twelfth aspect, wherein the plurality of outriggers each comprise outer ends interconnected only by the composite floor.

A fourteenth aspect of the present disclosure may include any one of the first through thirteenth aspects, wherein the at least one longitudinal floor support is positioned between the composite floor and upper faces of the plurality of lateral crawl space cross members.

A fifteenth aspect of the present disclosure may include any one of the first through fourteenth aspects, wherein the at least one longitudinal floor support is a single continuous longitudinal floor support.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially," "about," and "approximately" are utilized herein to represent the inherent degree of uncertainty that may be attributed to any quantitative comparison, value, measurement, or other representation. The terms "substantially," "about," and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A recreational vehicle comprising a chassis, at least one axle assembly, a vehicle body, and a floor, wherein:
   the vehicle body and the floor are supported by the chassis;
   the axle assembly is coupled to the chassis and provides motive support and underbody clearance to the chassis;
   the chassis comprises a plurality of longitudinal main rails, a plurality of lateral crawl space cross members, and a longitudinal floor support, wherein:
   the floor, the plurality of longitudinal main rails, the plurality of lateral crawl space cross members, and the longitudinal floor support collectively define at least one crawl space; and
   each of the at least one crawl space having an upper surface defined by the floor, a bottom surface defined by the plurality of lateral crawl space cross members, and sides defined by one of the longitudinal main rails and the longitudinal floor support;
   the plurality of longitudinal main rails span a length of the vehicle body and define a length of the at least one crawl space;
   the plurality of lateral crawl space cross members extend between and interconnect the plurality of longitudinal main rails and define a width of the at least one crawl space, wherein an upper face of the plurality of lateral crawl space cross members is lower than an upper face of the plurality of longitudinal main rails; and
   the longitudinal floor support is positioned between the floor and the plurality of lateral crawl space cross members, the longitudinal floor support is operable to provide support to the floor.

2. The recreational vehicle of claim 1, further comprising at least one insulation sheet, disposed at the bottom surface and the sides of the at least one crawl space.

3. The recreational vehicle of claim 1, wherein the longitudinal floor support comprises a single longitudinal support.

4. The recreational vehicle of claim 3, wherein the single longitudinal floor support is a single continuous longitudinal floor support.

5. The recreational vehicle of claim 1, wherein:
a holding tank receiving area is defined below the at least one crawl space;
the holding tank receiving area is operable to receive and support at least one holding tank; and
the longitudinal floor support is positioned between the floor, the plurality of lateral crawl space cross members, and the at least one holding tank, the longitudinal floor support is operable to provide support to the floor and to limit upward expansion of an upper surface of the at least one holding tank toward the floor.

6. The recreational vehicle of claim 5, wherein the holding tank receiving area comprises an area below the at least one longitudinal floor support, between a pair of the plurality of longitudinal main rails, and between a pair of the plurality of lateral crawl space cross members.

7. The recreational vehicle of claim 1, wherein the chassis further comprises a plurality of outriggers extending from the plurality of longitudinal main rails, the plurality of outriggers are operable to support an outer periphery of the floor, and the plurality of outriggers each comprise outer ends interconnected only by the floor.

8. The recreational vehicle of claim 1, wherein the longitudinal floor support comprises a hat channel having an upper surface, two vertical surfaces extending from the upper surface, and
a lower surface extending from the two vertical surfaces and substantially parallel to the upper surface.

9. The recreational vehicle of claim 1, wherein the floor is a composite floor comprising an upper sheet, a lower sheet, and a skeletal framework or foam core insert disposed between the upper and lower sheets as a structurally integrated composite.

10. The recreational vehicle of claim 1, further comprising a climate control system with ductwork, at least a portion of the ductwork of the climate control system comprising rigid ductwork that is routed in the at least one crawl space.

11. The recreational vehicle of claim 10, wherein the ductwork is non-insulated.

12. The recreational vehicle of claim 10, wherein the ductwork of the climate control system is a supply duct and a remaining area in the at least one crawl space being a return plenum.

13. A recreational vehicle comprising a chassis, at least one axle assembly, a vehicle body, and a floor, wherein:
the vehicle body and the floor are supported by the chassis;
the axle assembly is coupled to the chassis and provides motive support and underbody clearance to the chassis;
the chassis comprises a plurality of longitudinal main rails, a plurality of lateral crawl space cross members, at least one longitudinal floor support, and at least one insulation sheet, wherein:
the floor, the plurality of longitudinal main rails, the plurality of lateral crawl space cross members, the at least one longitudinal floor support, and the at least one insulation sheet collectively define at least one crawl space; and
each of the at least one crawl space having an upper surface defined by the floor, a bottom surface defined by the plurality of lateral crawl space cross members and the at least one insulation sheet, and sides defined by the at least one insulation sheet, thereby providing the at least one crawl space with insulation at least below and to each side of the at least one crawl space;
the plurality of lateral crawl space cross members extend between and interconnect the plurality of longitudinal main rails and define a width of the at least one crawl space, wherein an upper face of the plurality of lateral crawl space cross members is lower than an upper face of the plurality of longitudinal main rails; and
the at least one longitudinal floor support is positioned between the floor and the plurality of lateral crawl space cross members, the at least one longitudinal floor support is operable to provide support to the floor.

14. The recreational vehicle of claim 13, wherein the at least one insulation sheet lines an inner surface of the plurality of longitudinal main rails, sides of the at least one longitudinal floor support, and an upper face of the plurality of lateral crawl space cross members, the at least one insulation sheet spanning gaps between the plurality of lateral crawl space cross members.

15. The recreational vehicle of claim 13, wherein the at least one longitudinal floor support comprises a single longitudinal support.

16. The recreational vehicle of claim 15, wherein the single longitudinal floor support is a single continuous longitudinal floor support.

17. The recreational vehicle of claim 13, wherein:
a holding tank receiving area is defined below the at least one crawl space;
the holding tank receiving area is operable to receive and support at least one holding tank; and
the at least one longitudinal floor support is positioned between the floor, the plurality of lateral crawl space cross members, and the at least one holding tank, the at least one longitudinal floor support is operable to provide support to the floor and to limit upward expansion of an upper surface of the at least one holding tank toward the floor.

18. The recreational vehicle of claim 13, wherein the chassis further comprises a plurality of outriggers extending from the plurality of longitudinal main rails, the plurality of outriggers are operable to support an outer periphery of the floor, and the plurality of outriggers each comprise outer ends interconnected only by the floor.

19. The recreational vehicle of claim 13, wherein the at least one longitudinal floor support comprises a hat channel having an upper surface, two vertical surfaces extending from the upper surface, and a lower surface extending from the two vertical surfaces and substantially parallel to the upper surface.

20. The recreational vehicle of claim 13, wherein the floor is a composite floor comprising an upper sheet, a lower sheet, and a skeletal framework or foam core insert disposed between the upper and lower sheets as a structurally integrated composite.

21. The recreational vehicle of claim 13, further comprising a climate control system with ductwork, at least a portion of the ductwork of the climate control system comprising rigid ductwork that is routed in the at least one crawl space.

22. The recreational vehicle of claim 21, wherein the ductwork is non-insulated.

23. The recreational vehicle of claim 21, wherein the ductwork of the climate control system is a supply duct and a remaining area in the at least one crawl space being a return plenum.

24. A recreational vehicle comprising a chassis, at least one axle assembly, a vehicle body, and a floor, wherein:
the vehicle body and the floor are supported by the chassis;
the axle assembly is coupled to the chassis and provides motive support and underbody clearance to the chassis;
the chassis comprises a plurality of longitudinal main rails, a plurality of lateral crawl space cross members, and a single longitudinal floor support, wherein:
the floor, the plurality of longitudinal main rails, the plurality of lateral crawl space cross members, and the longitudinal floor support collectively define at least one crawl space; and
each of the at least one crawl space having an upper surface defined by the floor, a bottom surface defined by the plurality of lateral crawl space cross members, and sides defined by one of the longitudinal main rails and the longitudinal floor support;
the plurality of lateral crawl space cross members extend between and interconnect the plurality of longitudinal main rails and define a width of the at least one crawl space, wherein an upper face of the plurality of lateral crawl space cross members is lower than an upper face of the plurality of longitudinal main rails; and
the single longitudinal floor support is positioned between the floor and the plurality of lateral crawl space cross members, the single longitudinal floor support is_operable to provide support to the floor.

25. The recreational vehicle of claim 24, wherein the single longitudinal floor support is a single continuous longitudinal floor support.

26. The recreational vehicle of claim 24, wherein:
a holding tank receiving area is defined below the at least one crawl space;
the holding tank receiving area is operable to receive and support the at least one holding tank; and
the single longitudinal floor support is positioned between the floor, the plurality of lateral crawl space cross members, and at least one holding tank, the single longitudinal floor support is operable to provide support to the floor and to limit upward expansion of an upper surface of the at least one holding tank toward the floor.

27. The recreational vehicle of claim 24, wherein the chassis further comprises a plurality of outriggers extending from the plurality of longitudinal main rails, the plurality of outriggers are operable to support an outer periphery of the floor, and the plurality of outriggers each comprise outer ends interconnected only by the floor.

28. The recreational vehicle of claim 24, wherein the single longitudinal floor support comprises a hat channel having an upper surface, two vertical surfaces extending from the upper surface, and a lower surface extending from the two vertical surfaces and substantially parallel to the upper surface.

29. The recreational vehicle of claim 24, wherein the floor is a composite floor comprising an upper sheet, a lower sheet, and a skeletal framework or foam core insert disposed between the upper and lower sheets as a structurally integrated composite.

30. The recreational vehicle of claim 24, further comprising a climate control system with ductwork, at least a portion of the ductwork of the climate control system comprising rigid ductwork that is routed in the at least one crawl space.

31. The recreational vehicle of claim 30, wherein the ductwork is non-insulated.

32. The recreational vehicle of claim 30, wherein the ductwork of the climate control system is a supply duct and a remaining area in the at least one crawl space being a return plenum.

* * * * *